United States Patent
Angell et al.

[11] Patent Number: 6,155,057
[45] Date of Patent: Dec. 5, 2000

[54] REFRIGERANT FLUID CRYSTALLIZATION CONTROL AND PREVENTION

[75] Inventors: Charles A. Angell, Mesa; Vesselin Velikov; Hemalata Senapati, both of Tempe, all of Ariz.

[73] Assignee: Arizona Board of Regents, Tempe, Ariz.

[21] Appl. No.: 09/260,473

[22] Filed: Mar. 1, 1999

[51] Int. Cl.[7] .................................................. F25D 5/00

[52] U.S. Cl. .................................................... 62/4

[58] Field of Search ........................ 62/4, 141, 103

[56] References Cited

U.S. PATENT DOCUMENTS

| | | | |
|---|---|---|---|
| 5,390,509 | 2/1995 | Rockenfeller et al. | 62/476 |
| 5,653,117 | 8/1997 | Kujak | 62/112 |
| 5,783,104 | 7/1998 | Kujak | 252/69 |

*Primary Examiner*—William Doerrler
*Assistant Examiner*—Malik N. Drake
*Attorney, Agent, or Firm*—Baker Botts L.L.P.

[57] ABSTRACT

Methods of controlling crystallization of aqueous lithium halide refrigerant fluids utilizing an organic counter cation-containing salt material effective to depress the crystallization temperature of the refrigerant fluid and corresponding refrigerant fluids.

46 Claims, 14 Drawing Sheets

6,155,057

REFRIGERANT FLUID CRYSTALLIZATION CONTROL AND PREVENTION

BACKGROUND OF THE INVENTION

This invention relates generally to refrigerant fluids and, more particularly, to the control and prevention of crystallization of refrigerant fluids such as refrigerant fluids composed of a lithium halide, e.g., lithium bromide or lithium chloride, and water.

Some 50 percent of the world's industrial refrigeration equipment is based on the use of absorption refrigeration principles. In the most common application of these principles, heat is used to drive water from the solution in one place (e.g., outside) after which the separated water is first condensed and then evaporated, with associated cooling, and reabsorbed in the salt solution in another place (e.g., inside).

As will be appreciated, the efficiency of an absorption refrigeration process is typically dependent on a number of factors. The boiling point of the absorption fluid is often an important factor because it reflects not only the heat input needed to separate the water from the solution but also, through its connection to the thermodynamic activity of the water in the solution, the drive to reabsorb it in the cooling part of the cycle. For high efficiency, a high boiling point is generally considered desirable.

Unfortunately, in normal practice, limits may be imposed on the boiling point of the refrigerant fluid because of intervention related to crystallization of salt hydrates in lower temperature parts of the equipment if the concentration of salt becomes too high. More specifically, lithium bromide and water compositions having suitably high boiling points are typically prone to crystallization of LiBr hydrates, the formation of which can undesirably block or otherwise obstruct a system piping. In particular, the inadvertent crystallization, such as in block form, of the lithium bromide dihydrate can be catastrophic. Consequently, lithium bromide and water refrigerant fluids have commonly been restricted to compositions which contain no more than about 25 mol % (61.6 wt %) LiBr and have a boiling point of only about 160° C.

One approach to avoiding such crystallization has involved the addition of trace additives such as may serve to deactivate the sources of heterogeneous nucleation and may also favorably affect the probability of homogeneous nucleation. In theory, such an approach would only necessitate the presence of such additives in relatively small quantities. Thus, the thermodynamic and mass transport properties of the solutions, which have generally been thoroughly characterized by the industry, desirably would only be minimally perturbed by such addition.

Unfortunately, while experience has shown that such a technique may be effective when used in conjunction with smaller sized samples, experience has also shown that process thermodynamics are not as readily or easily overcome when such a technique is applied on industrial facility scale quantity solution samples.

Another approach, much pursued by industry, involves reducing or lowering the activity of the LiBr by the addition of a Lewis acid, such as $ZnCl_2$ or $ZnBr_2$, in order to yield high boiling solutions having low melting temperatures. The acid-base interaction associated with such an approach produces low basicity anions, like $ZnCl_4^{2-}$, $ZnBr_4^{2-}$ and their mixed ligand variants. To be effective, a rather large mole fraction of tetrahalozincate anion is generally required. As a result, such an approach may undesirably decrease the water content of the solution significantly and undesirably alter other properties of the solution, such as the density and viscosity.

Still another approach is to use an additive which, rather than chemically interacting with the solution, generally takes advantage of the ideal mixing laws for components of binary solutions in which each of the binary solution components are insoluble in the crystal lattice of the other solution component. Thus, mixtures of $LiBr.2H_2O$ and $LiSCN.2H_2O$ can be used to obtain a pseudo-binary eutectic mixture which has a lower melting point than either of the components taken alone. On dilution with additional water, the crystallization of the dihydrate, at ambient temperature, is suppressed. This admixture perturbs the properties of the $LiBr+H_2O$ system rather minimally because $SCN^-$, acts as a "pseudo-halogen," resulting in solution properties similar to those of the bromide. In particular, the boiling point is relatively unchanged from that of the LiBr solution of the same water content. Unfortunately, LiSCN is generally much more expensive than LiBr and relatively large amounts of the LiSCN are generally required for this approach to be successful.

Thus, there is a need and a demand for a method of avoiding or suppressing unwanted crystallization of or from such a refrigerant fluid without undesirably depressing the boiling point of such refrigerant fluid, as well as a need and a demand for an aqueous lithium halide solution refrigerant fluid (such as of lithium bromide) having a relatively high boiling point and which desirably minimizes or avoids crystallization such as may undesirably obstruct or block system piping.

SUMMARY OF THE INVENTION

A general object of the invention is to provide improved refrigerant fluids and improved control and prevention of crystallization of refrigerant fluids such as of refrigerant fluids of a lithium halide, e.g., lithium bromide or lithium chloride, and water.

A more specific objective of the invention is to overcome one or more of the problems described above.

The general object of the invention can be attained, at least in part, by a method of controlling crystallization in a refrigerant fluid which includes water and at least one lithium halide selected from the group consisting of lithium chloride, lithium bromide, lithium iodide and mixtures thereof. In accordance with one preferred embodiment of the invention, one such method involves the step of adding to the refrigerant fluid a specified salt material which includes an organic counter cation effective to suppress crystallization of the refrigerant fluid.

The prior art fails to provide as effective as desired refrigerant fluids and methods for controlling or preventing crystallization of refrigerant fluids such as of refrigerant fluids of a lithium halide, e.g., lithium bromide or lithium chloride, and water. In particular, prior art approaches to controlling or preventing the crystallization of LiBr hydrates from such refrigerant fluids generally suffer by requiring the addition or presence of specified additives in greater than may be desired quantities. For example, the required presence of the specified additive in relatively large quantities may undesirably alter one or more thermodynamic or mass transport properties of the solution. Also, the water content of the solution may be undesirably decreased considerably. Further, the density of the solution may be undesirably increased considerably. Still further, the addition of at least some of such prior art additives may undesirably impact process economics such as may undesirably limit or restrict the more widespread effective use of such refrigeration processing.

The invention further comprehends a method of controlling crystallization in a refrigerant fluid which includes water and at least one lithium halide selected from the group consisting of lithium chloride, lithium bromide, lithium iodide and mixtures thereof. In accordance with one preferred embodiment, such method includes the step of adding to the refrigerant fluid a lithium salt and an organic salt material formed of a basic anion selected from the group consisting of chloride and bromide and an alkyl ammonium counter cation with the lithium salt and organic salt synergistically suppressing crystallization of the lithium halide.

The invention still further comprehends a refrigerant fluid which includes an aqueous lithium halide solution and a salt material formed of a basic anion selected from the group consisting of chloride and bromide and an organic counter cation effective to inhibit crystallization of the refrigerant fluid.

Other objects and advantages will be apparent to those skilled in the art from the following detailed description taken in conjunction with the appended claims and drawings.

DETAILED DESCRIPTION OF THE INVENTION

The present invention provides improved refrigerant fluids and improved control and prevention of crystallization of refrigerant fluids such as of refrigerant fluids containing water and at least one lithium halide, e.g., lithium chloride, lithium bromide, lithium iodide or mixtures thereof.

In accordance with one embodiment of the invention, a salt material which includes an organic counter cation is added to a refrigerant fluid such as composed of an aqueous solution of at least one lithium halide to suppress crystallization of the refrigerant fluid, e.g., lower, reduce or otherwise depress the crystallization temperature of the refrigerant fluid. In a preferred practice of the invention, the added salt material includes an organic counter cation effective to suppress crystallization of the refrigerant fluid.

Organic counter cations useful in the practice of the invention include: alkyl ammonium and phenyl and ethoxy derivatives thereof as well as heterocyclic analogs such as resonance-stabilized cyclic aromatic cations. Alkyl ammonium cations may be primary, secondary, tertiary or quaternary, as may be desired. Particular alkyl ammonium cations useful in the practice of the invention include ethylammonium and dimethylammonium cations, for example. Particular heterocyclic cations useful in the practice of the invention include pyridinium and imidazolium. These cations are typically introduced as the chloride or bromide salts, e.g., ethylammonium chloride ("EAC").

Other useful organic counter cations in accordance with the invention include phosphonium and sulfonium.

The added salt material may also desirably include an anion which is weakly basic. Particularly useful weakly basic anionic materials for use in the practice of the invention include chloride and bromide, for example. It will be understood, however, that various other weakly basic anionic materials, such as selected from the group consisting of perchlorate, fluorosulfate, nitrate, tetrafluoroborate, tetraphenylborate and mixtures thereof can be used.

The added salt material may alternatively, if desired, include an anion in the form of a pseudohalide such as $SCN^-$ or $CNO^-$, for example.

In accordance with a preferred embodiment of controlling crystallization in a refrigerant fluid which includes a lithium halide and water, also added to the refrigerant fluid is a quantity of an inorganic salt which, together with the organic salt, described above, acts to further depress the crystallization temperature of the refrigerant fluid lithium halide. Such inorganic salt may preferably be in the form of a lithium salt such as LiSCN.

Figure 1A:
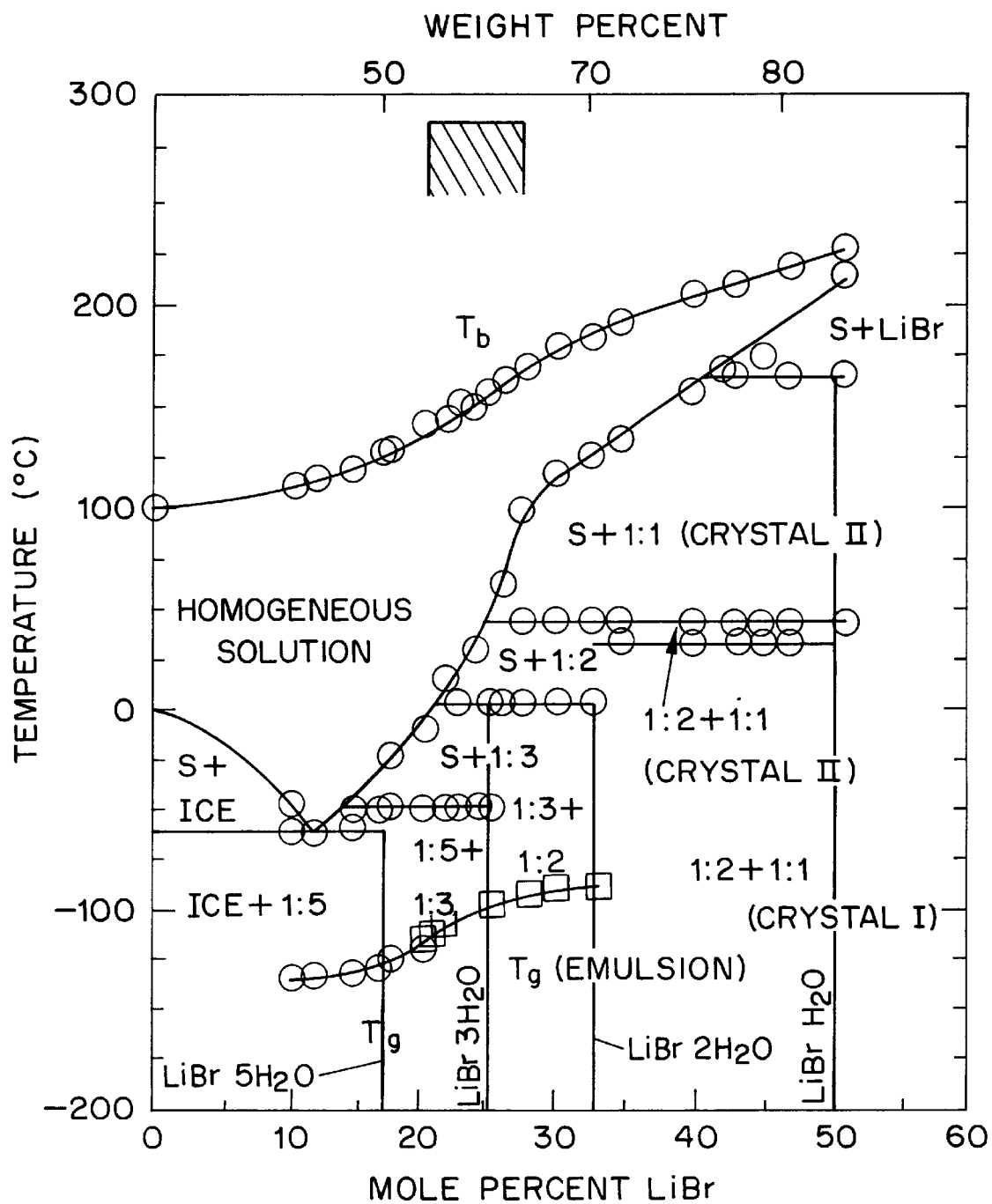
FIG. 1a is a phase diagram of the $LiBr+H_2O$ system.

Turning to FIG. 1a, there is shown the $LiBr+H_2O$ phase diagram, including glass transition temperatures, $T_g$, and boiling points, $T_b$. In FIG. 1a, S refers to a solution that is in equilibrium with the crystal phase. The crystal phases that exist in each region are designated by their salt-to-water ratio; e.g., 1:5 refers to the $LiBr.5H_2O$ crystal. Crystal 1 and crystal II are different polymorphic forms of the monohydrate. The shaded area shows the general domain of interest to industrial refrigeration.

As shown, lithium bromide monohydrate should form first on cooling of a homogenous solution of composition 28 mol % LiBr. By the lever rule, only a small amount should form before the solution reaches the peritectic freezing point of the dihydrate. As identified above, the crystallization of this phase, such as into massive block crystals, can be a fundamental problem impeding efficient utilization of the LiBr solution-based absorption refrigeration because it restricts the usable solution composition to 25 mol % LiBr which has boiling point only 157° C.

Figure 1B:
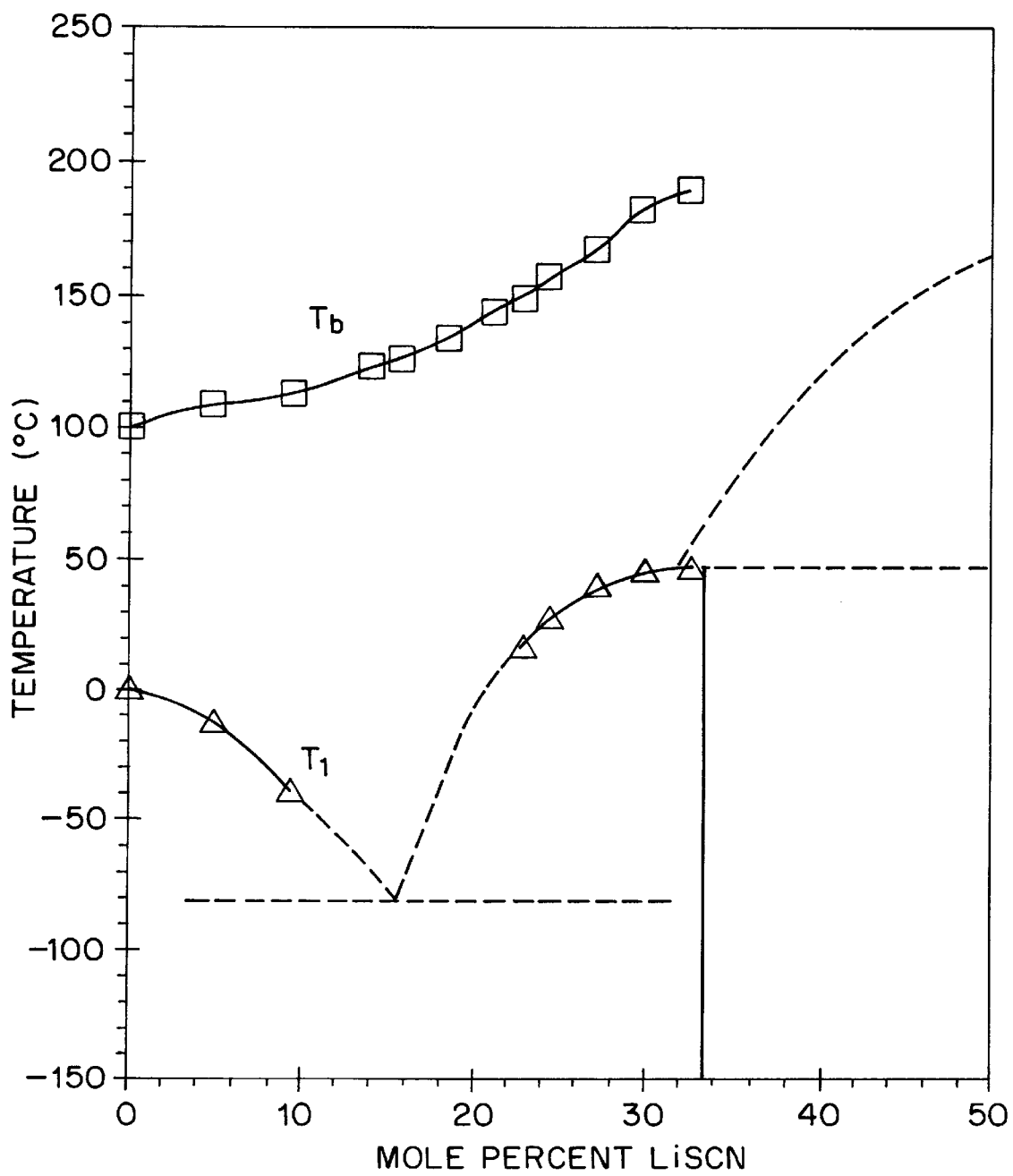
FIG. 1b is an approximate phase diagram for the $LiSCN+H_2O$ system including boiling line.

FIG. 1b shows the boiling line and an approximate phase diagram for the $LiSCN+H_2O$ system. It is seen that the $LiSCN+H_2O$ system exhibits a close similarity to the $LiBr+H_2O$ system, for example, the LiSCN dihydrate melts (peritectically) at essentially the same temperature as does the LiBr dihydrate.

Figure 1C:
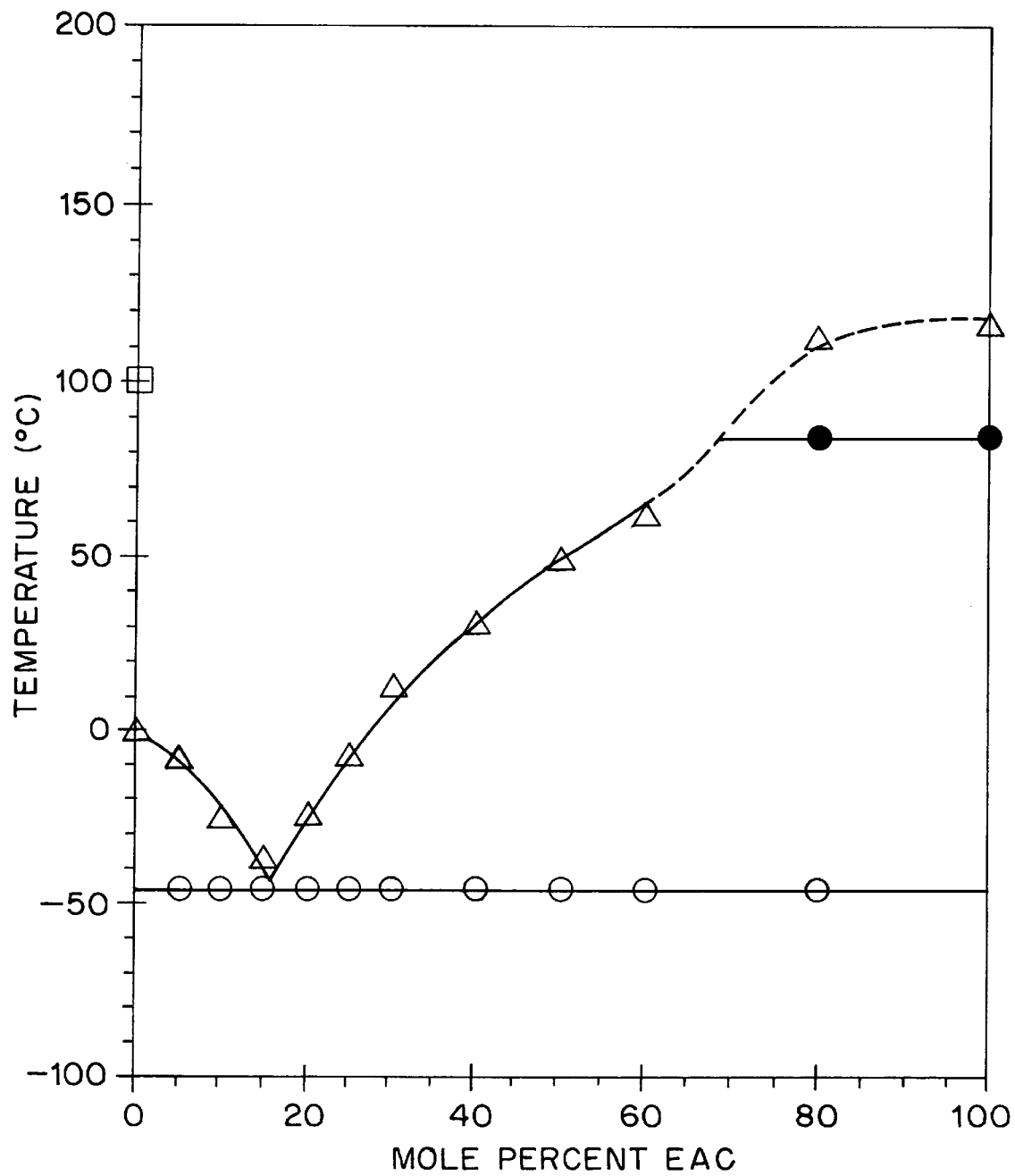
FIG. 1c is an approximate phase diagram for ethylammonium chloride ("EAC")+water system.

FIG. 1c shows the liquidus temperatures, and the eutectic melting line for the system $EAC+H_2O$. The eutectic is at −45° C., and despite the low melting point of EAC (109° C.) the ambient temperature solution becomes saturated with EAC when the EAC content exceeds 40 mol %. Since the eutectic can be seen (with diminishing strength) over the whole composition range examined, it seems likely that no hydrate exists in this system.

The present invention is described in further detail in connection with the following examples which illustrate/simulate various aspects involved in the practice of the invention. It is to be understood that all changes that come within the spirit of the invention are desired to be protected and thus the invention is not to be construed as limited by these examples.

EXAMPLES

To obtain solutions of the desired properties, ternary and quaternary solutions were prepared by adding EAC, either alone or in combination with LiSCN, to a starting aqueous solution of 28 mol % LiBr, with the results described below. In an extension of this work intended to produce solutions with boiling points even higher than that of the $(LiBr)_{28}(H_2O)_{72}$ solution, these admixtures have been repeated using a starting LiBr-water solution containing 30 mol % LiBr, which has a boiling point of 176° C.

Differential scanning calorimetry, DSC, was used to obtain the freezing points of small samples during cooling, and then the various melting transition temperatures and finally the liquidus temperature, during reheating. The boiling points were obtained separately by differential thermal analysis (DTA) in which unsealed sample containers were used without imperiling the instrumentation.

Approximate heat capacities of the solutions were obtained directly from the DSC scans, using the sample masses. They did not differ by more than 5% from that of the initial 28 mol % LiBr solution. Values are included in TABLE 1 presented below.

Viscosities of solutions at ambient temperatures were measured by capillary viscometry, using a calibrated Ubbelohde viscometer.

Densities of the solutions at ambient temperatures were determined by simply weighing solutions of known volume (10 ml) using a calibrated volumetric flask.

A quantity related to the corrosivity was obtained by the use of a standard pH meter with a glass electrode. As will be appreciated, with solutions as concentrated as used in these trials, it is normally considered inappropriate to call the measured quantity a pH on the dilute solution standard state scale, though it is a quantity related to the activity of hydrogen ions in the solution. Its relation to corrosion rates was identified by performing actual corrosion tests in which the loss of weight of zinc metal was measured as a function of immersion time in solutions held at different elevated temperatures.

Examples A

Solutions Based on 28 mol % (65.2 wt %) LiBr Starting Solution ($T_b$=170° C.)

The results of interest to refrigeration science are depicted graphically in FIGS. 2–7, augmented by Table 1, below.

Figure 2:
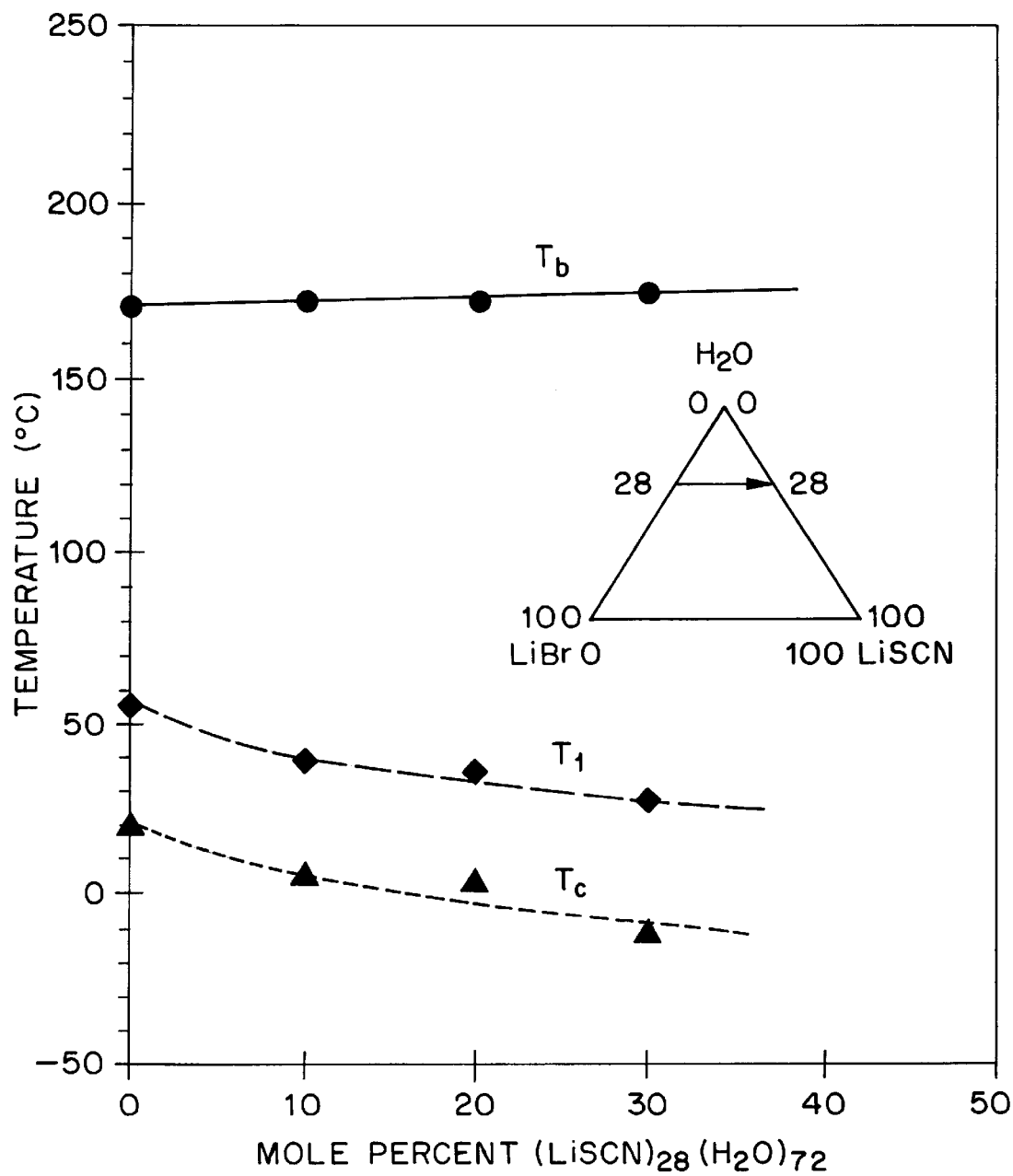
FIG. 2 is a graphical representation of the various phase transition lines: boiling temperature ($T_b$), liquidus ($T_l$), and crystallization temperature ($T_c$), as LiBr is replaced by LiSCN in the system $(LiBr)_{28}(H_2O)_{72}+(LiSCN)_{28}(H_2O)_{72}$.

FIG. 2 shows the effects of replacing LiBr in the 28 mol % aqueous solution by LiSCN. FIG. 2 shows that the boiling point increased slightly with increased LiSCN content, while the dihydrate crystallization temperature and (more importantly) the fusion temperature of the dihydrate on reheating, decreased.

Figure 3:
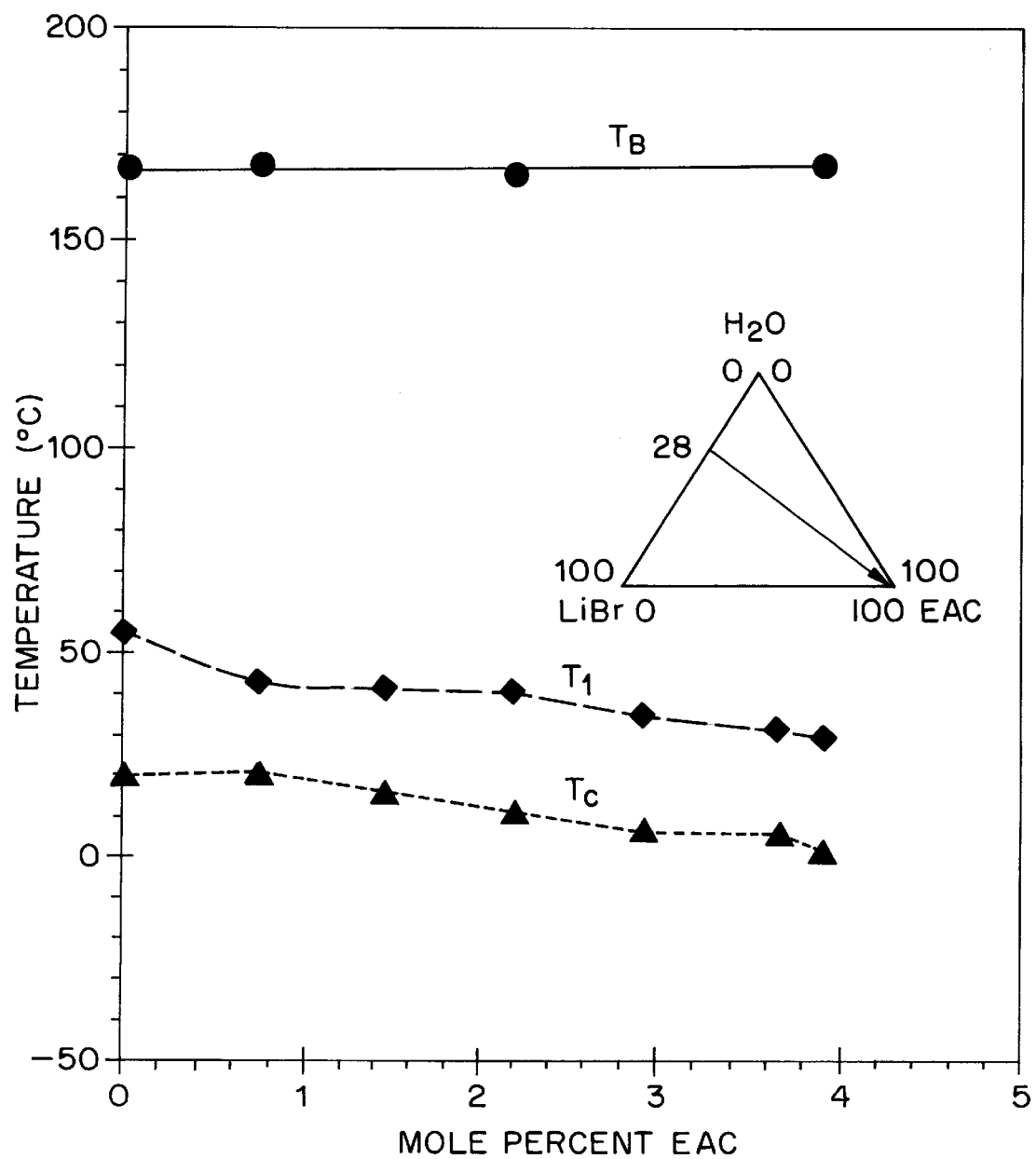
FIG. 3 is a graphical representation of the various phase transition lines: boiling temperature ($T_b$), liquidus temperature ($T_l$), and crystallization temperature ($T_c$) as EAC is added to the system $(LiBr)_{28}(H_2O)_{72}$, where $$\text{mol}\% \, EAC = \frac{\text{moles } EAC}{\text{moles } (LiBr)_{28}(H_2O)_{72} + \text{moles } EAC} \times 100.$$

FIG. 3 shows the effect of adding EAC to the 28 mol % LiBr solution. The composition axis corresponds to the moles $EAC/(moles\ (LiBr)_{28}(H_2O)_{72}+moles\ EAC)$ so that the mole ratio of $Li/H_2O$ remained constant for all compositions. FIG. 3 shows that the addition of 4 mol % EAC lowered the liquidus temperature from 55° C. almost to ambient. The less significant (and kinetically determined) crystallization temperature was thus depressed below 0° C.

Figure 4:
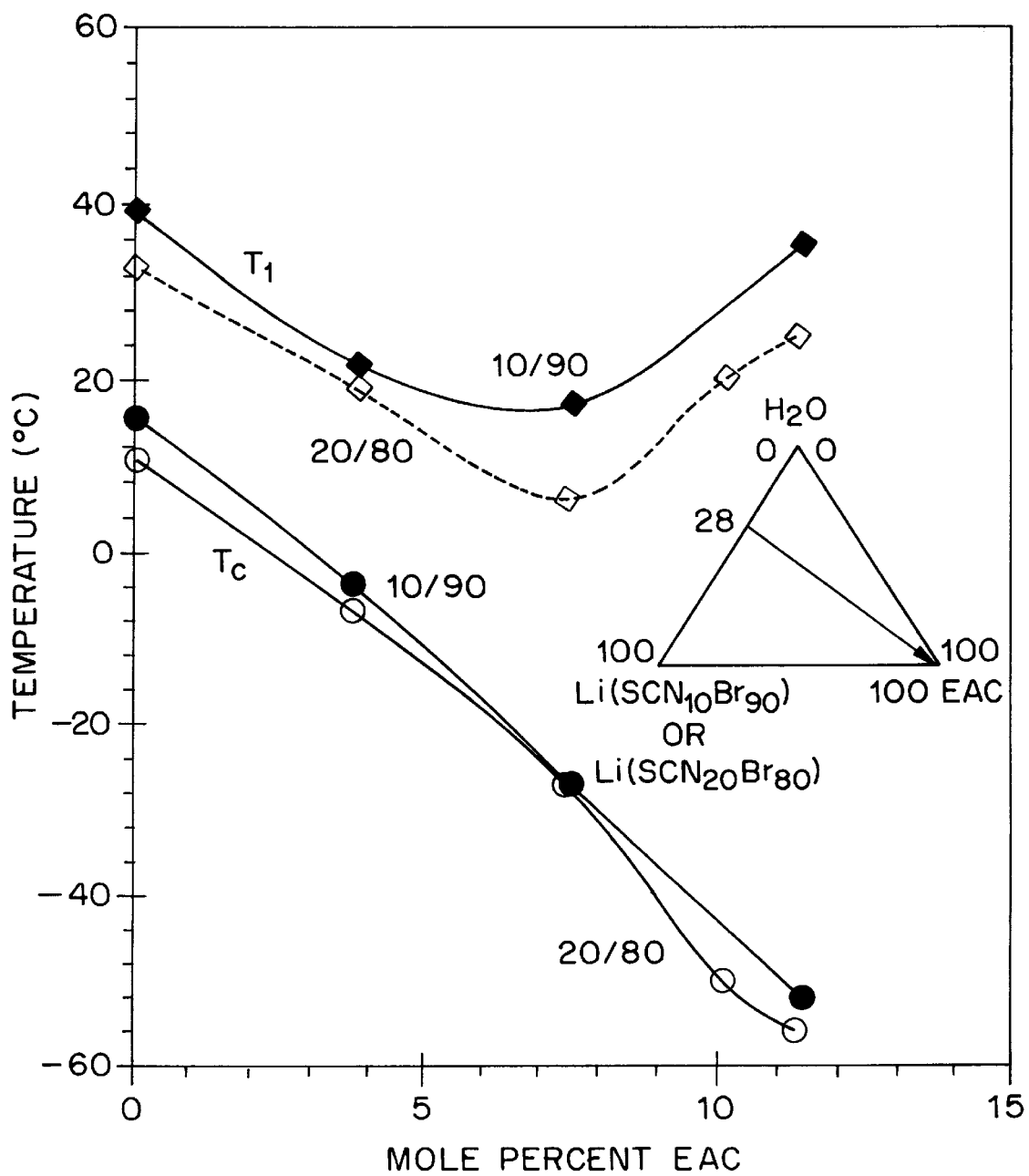
FIG. 4 is a graphical representation of the variation of the liquidus temperature ($T_l$) and crystallization temperature ($T_c$) with EAC content in the system $(LiSCN_xLiBr_{100-x})_{28}(H_2O)_{72}+EAC$, for the two cases x=10 and x=20.

FIG. 4 shows the effect of combining the above two additives. More specifically, FIG. 4 shows the effect of adding EAC to a mixed LiBr—LiSCN 28 mol % salt solution in which 10 mol % of the LiBr has been replaced by LiSCN (labeled 10/90) and when alternatively, 20 mol % LiBr has been replaced by LiSCN (labeled 20/80). FIG. 4 shows that the liquidus temperature was depressed to below ambient with the addition of 3 mol % of EAC for the 10/90 LiSCN/LiBr solution or 2.5 mol % for the 20/80 LiSCN/LiBr solution. Furthermore, the liquidus temperature may be depressed to as low as 10° C. when the EAC content of the 20/80 LiSCN/LiBr+EAC solution is 7 mol %. Thus, a permanent resistance to crystallization at ambient temperature, and even to well below ambient can be established for solutions in which the boiling point remains near 170° C.

Figure 5:
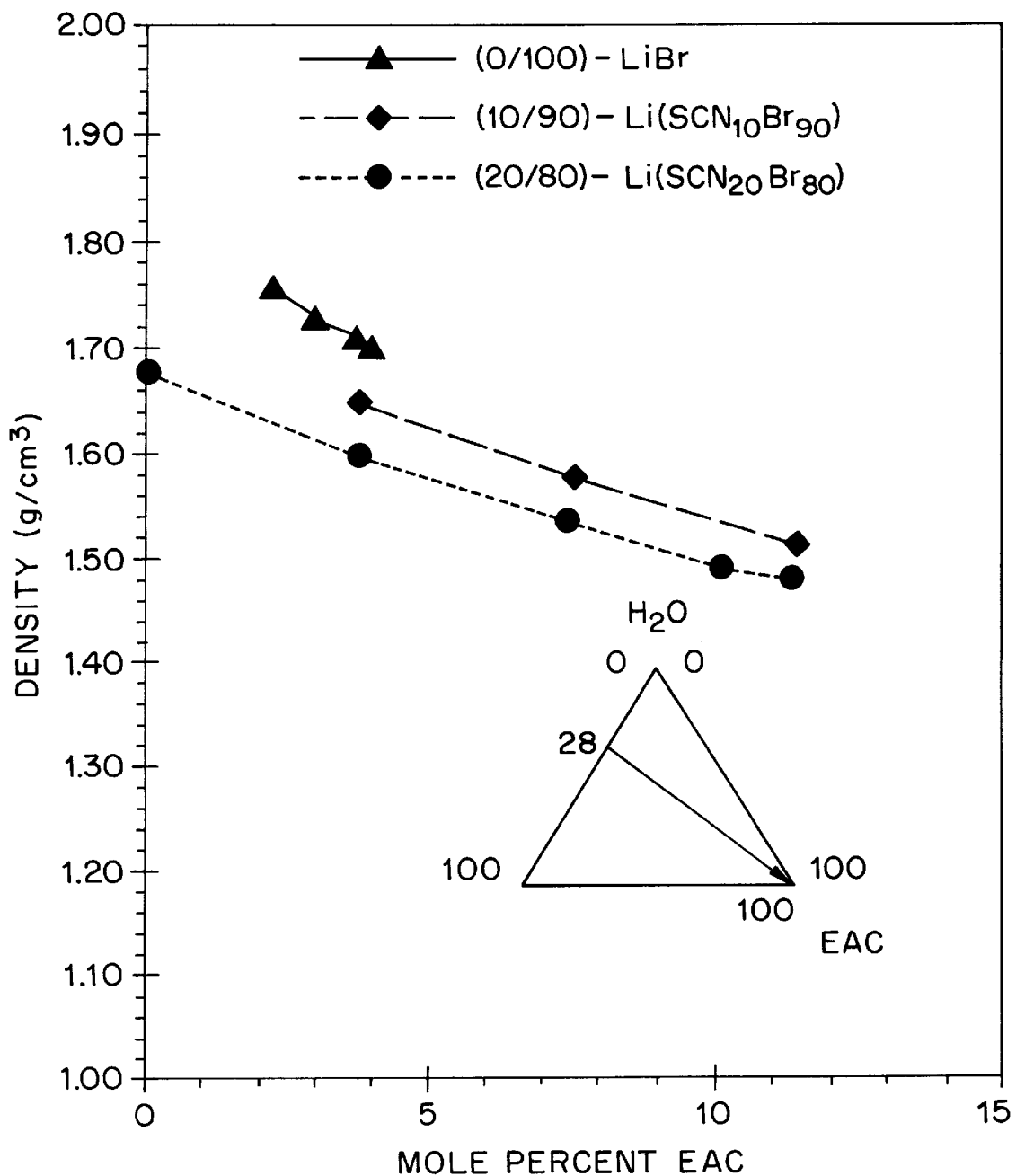
FIG. 5 is a graphical representation of the variation of ambient temperature density with EAC content in the systems of FIG. 3 and FIG. 4.

FIG. 5 shows the variation of the densities of all the above solutions with EAC content. All LiSCN-containing solutions have densities which are lower than those of the starting 28 mol % LiBr—H$_2$O solution, and addition of EAC lowers the corresponding solution densities even more rapidly.

Figure 6:
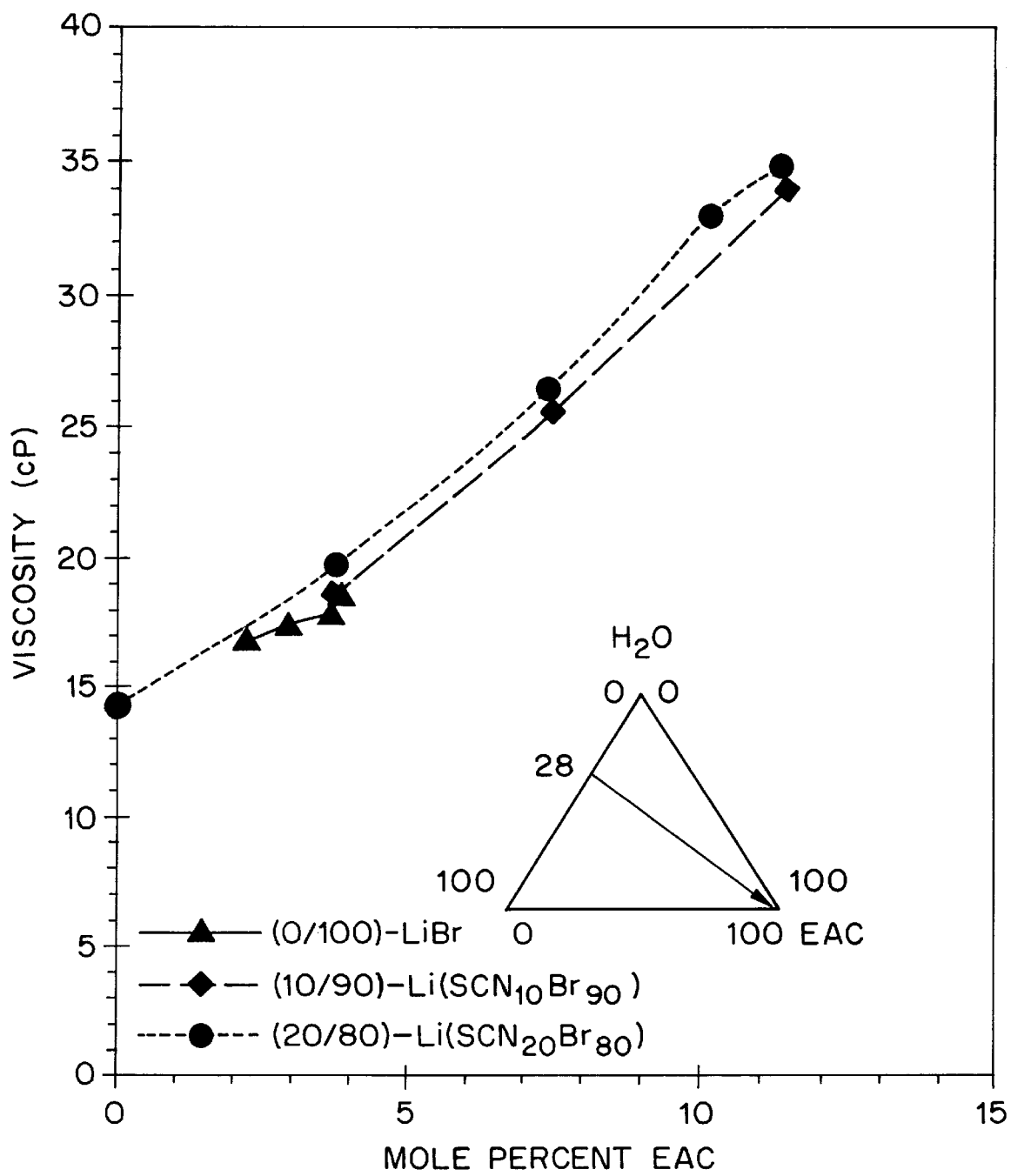
FIG. 6 is a graphical representation of the variation of ambient temperature viscosity with EAC content in the systems of FIG. 3 and FIG. 4.

Finally, FIG. 6 shows that the viscosity of the 28 mol % LiBr solution was increased by each of the above LiSCN and EAC additions. This is the only disadvantageous trend in the properties of the multi component solutions over the property of the original two component LiBr+H$_2$O solution. The 10/90 solution with 5 mol % EAC has a viscosity of 22 cp compared with 11 cp for the simple LiBr solution.

The results of pH tests on these solutions are summarized in TABLE 1. The results show that the pH of the starting 28 mol % LiBr solution was increased by both LiSCN and EAC additions, so all solutions would normally be considerably less corrosive than the original two component system, and even less corrosive than the ZnCl$_2$-doped solutions presently favored by the industry. Actual corrosion tests using Zn metal samples and measuring weight loss with time at different temperatures, directly bear out the expectations based on the pH measurements.

TABLE 1

Effect of Additives on the pH Of 28% Salt-In-Solvent Solution

| Sample | Relative Composition | | pH | $C_p$ at 60° C. [J/g · K] |
|---|---|---|---|---|
| | LiSCN/LiBr | EAC/H$_2$O | | |
| (LiBr)$_{28}$(H$_2$O)$_{72}$ | 0/100 | 0/100 | 4.2 | 1.808 |
| (LiBr)$_{26.8}$(H$_2$O)$_{69.3}$(EAC)$_{3.9}$ | 0/100 | 6/94 | 5.3 | 1.822 |
| (LiSCN)$_{2.8}$(LiBr)$_{25.2}$(H$_2$O)$_{72}$ | 10/90 | 0/100 | 6.5 | 1.857 |
| (LiSCN)$_{2.7}$(LiBr)$_{24.3}$(H$_2$O)$_{69.3}$(EAC)$_{3.7}$ | 10/90 | 5/95 | 6.8 | 1.886 |
| (LiSCN)$_{2.6}$(LiBr)$_{23.3}$(H$_2$O)$_{66.6}$(EAC)$_{7.5}$ | 10/90 | 10/90 | 6.4 | 1.901 |

Examples B

Solutions Based on 30 mol % (67.4 wt %) LiBr Starting Solution (T$_b$=176° C.)

Parallel studies on solutions of higher LiBr content and therefore higher boiling points were conducted to see whether even more highly performing solutions were possible. These results are briefly summarized as follows.

Figure 7:
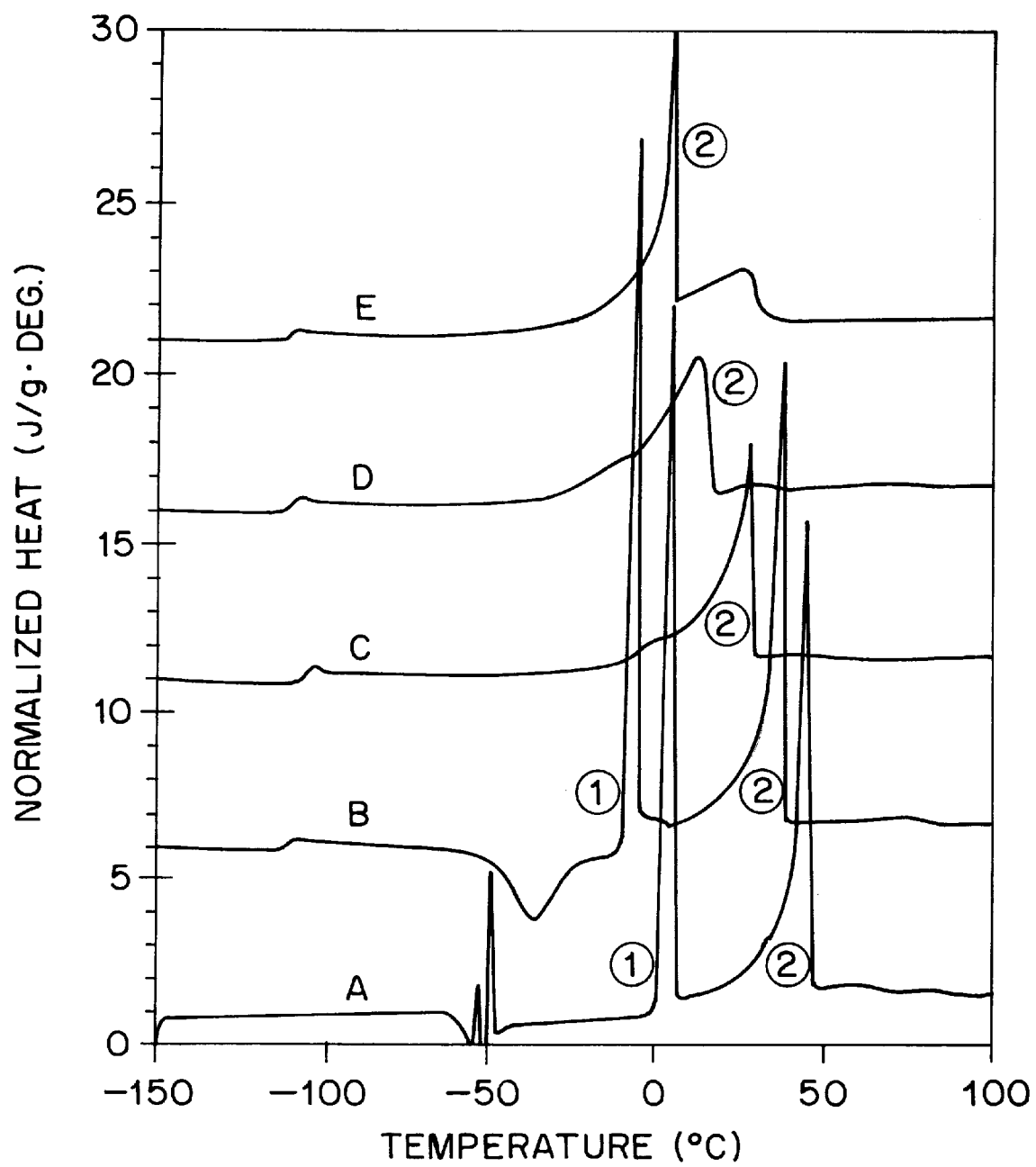
FIG. 7 is a graphical representation of DSC heating scans for a series of solutions based on the 30 mol % LiBr starting solution:
  scan A—shows the behavior of the starting solution;
  scan B—shows the effect of replacing 10 mol % of the LiBr by LiSCN, designated (10/90);
  scan C—shows the effect of adding EAC in a ratio 5/95 $EAC/H_2O$ to the scan B solution;
  scan D—show the effect of adding EAC in a ratio 10/90 $EAC/H_2O$ to the scan B solution; and
  scan E—show the effect of adding EAC in a ratio 15/85 $EAC/H_2O$ to the scan B solution.

FIG. 7 shows the actual DSC scans on heating from a low temperature, partly crystallized, state of a series of solutions in which the water-to-Li$^+$ ratio was kept constant at the value of the 30 mol % LiBr—H$_2$O solution. The lowest scan of the plot (scan A) shows the behavior of the starting binary solution. Attention was focused on the two high temperature transitions marked 1 and 2 on the plots. Transition 1 is the peritectic fusion of the trihydrate crystal while transition 2 is the peritectic fusion of the dihydrate. Scan B is for the solution in which 10 mol % of the LiBr was replaced by LiSCN. It shows that both transitions 1 and 2 were maintained but were displaced to lower temperatures. Scan C is for the solution of scan B in which EAC was added, while keeping the H$_2$O/Li$^+$ ratio constant, such that the EAC to H$_2$O ratio was maintained at 5 to 95. Scan C shows that the trihydrate no longer crystallized and that the dihydrate fused completely below ambient temperature. Increasing the EAC content (scans D and E) continued to depress the stability of the dihydrate such that for EAC/H$_2$O=15/85 (scan E), all the dihydrate was melted by about 5° C. However, now a new crystalline material, presumed to be EAC itself, remained unmelted until 25° C. Experience has shown that this remnant crystal is light, uncongealed and easy to displace, and hence would not normally constitute any significant obstruction threat to a corresponding cooling system. The boiling points of these solutions were in the vicinity of 175° C., while the pH remains high. A possible disadvantage is that the ambient temperature viscosity of the solution is quite high, ~45 cp, compared to ~15 cp (both by extrapolation) for the starting LiBr solution.

Additionally, as described in greater detail below, thermal stabilization by use of the above-identified heterocyclic structures, in particular such heterocyclic cation chlorides and bromides may be of advantage in systems subject to high temperatures (e.g., 170–220° C.).

Examples C

Solutions Based on 28 mol % (65.2 wt %) LiBr Starting Solution (T$_b$=170° C.) Using Dimethylammonium Chloride, Pyridinium Chloride, and Imidazolium Chloride, and Their Bromide Counterparts The procedures adopted were identical to those described above relative to the Examples set A.

Figure 8:
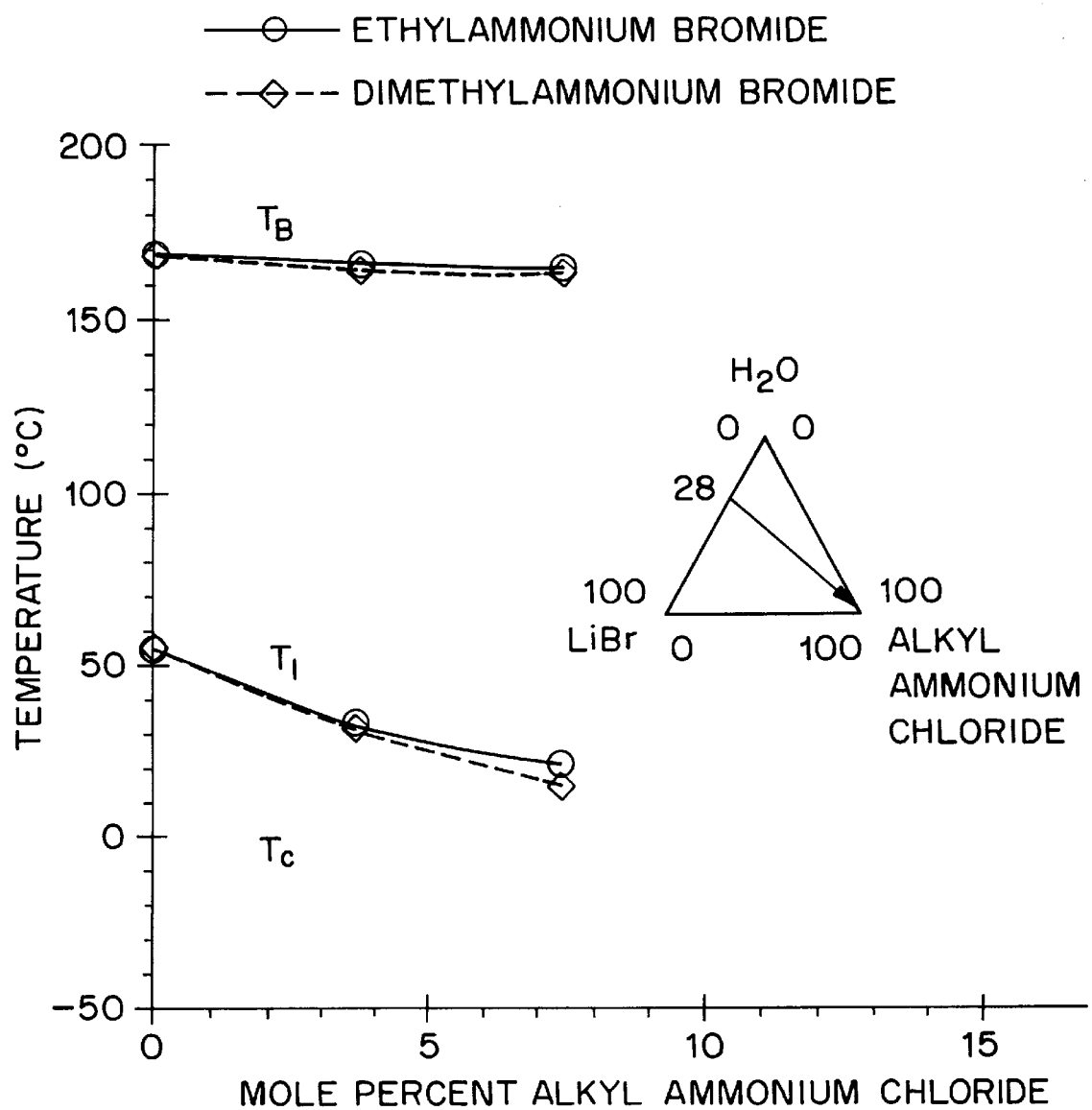
FIG. 8 is a graphical representation of the boiling temperature ($T_b$) and liquidus temperature ($T_l$) phase transitions for alkyl ammonium chloride salt (i.e., dimethylammonium chloride and ethylammonium chloride, respectively) doped solutions of $(LiBr)_{28}(H_2O)_{72}$.

Crystallization and boiling temperatures for dimethylammonium chloride-doped solutions based on a 28 mol % lithium bromide starting solution are shown in FIG. 8. FIG. 8 also illustrates the results obtained for the previously reported ethylammonium chloride compound in similarly concentrated solutions. As shown, the results obtained for dimethylammonium chloride-doped solutions are comparable to those obtained with the ethylammonium chloride-doped solutions.

Figure 9:
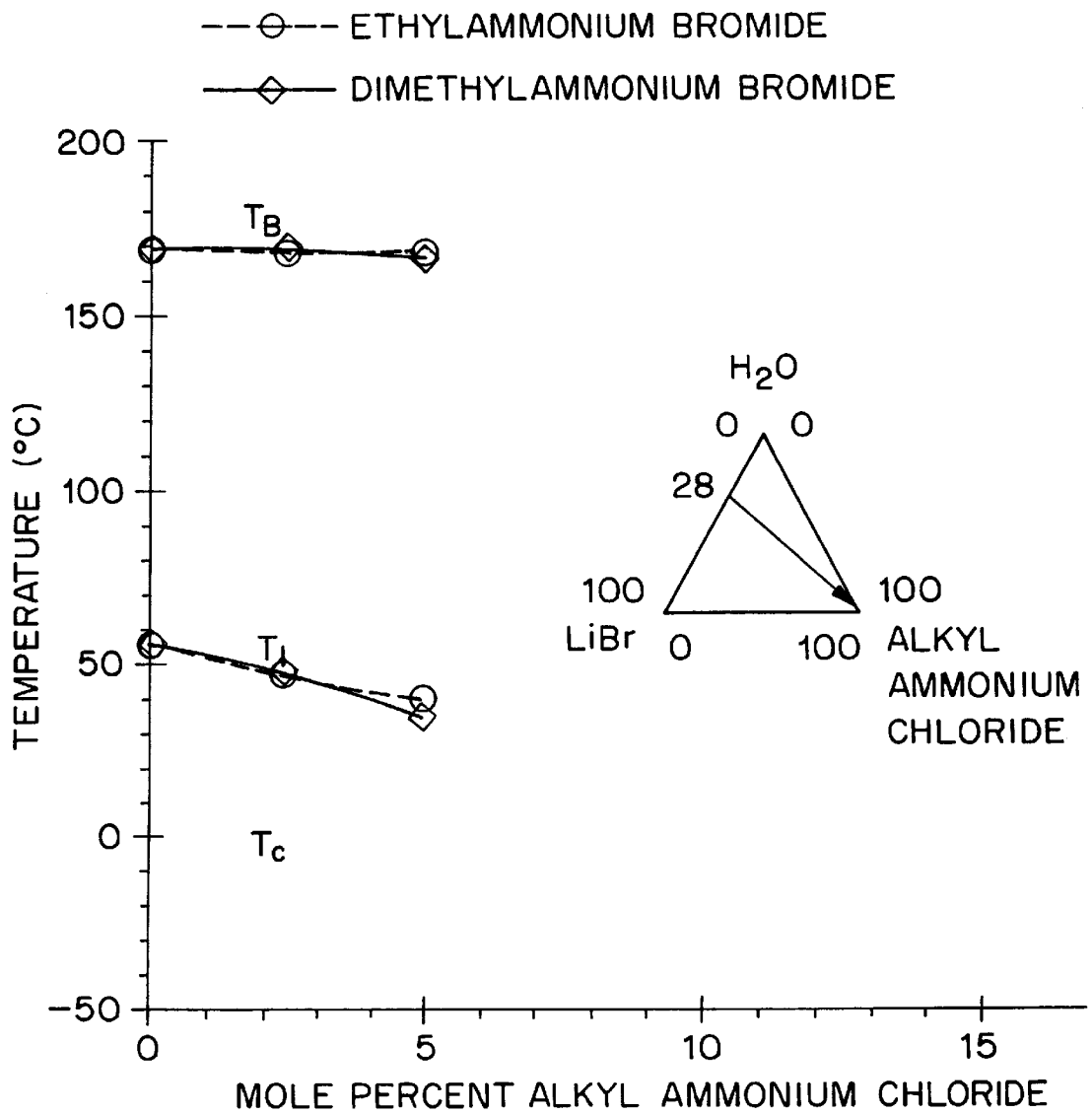
FIG. 9 is a graphical representation of the boiling temperature ($T_b$) and liquidus temperature ($T_l$) phase transitions for alkyl ammonium bromide salt (i.e., dimethylammonium bromide and ethylammonium bromide, respectively) doped solutions of $(LiBr)_{28}(H_2O)_{72}$.

Results for an all-bromide system are shown in FIG. 9. As expected, the absence of the anion mixing effect in the entropy of the solution results in less effective melting point lowering, while the boiling point is more or less unaffected. The melting point lowering is nevertheless very significant and this may be a preferred solution in view of the lower corrosion characteristics known for bromide solutions.

Figure 10:
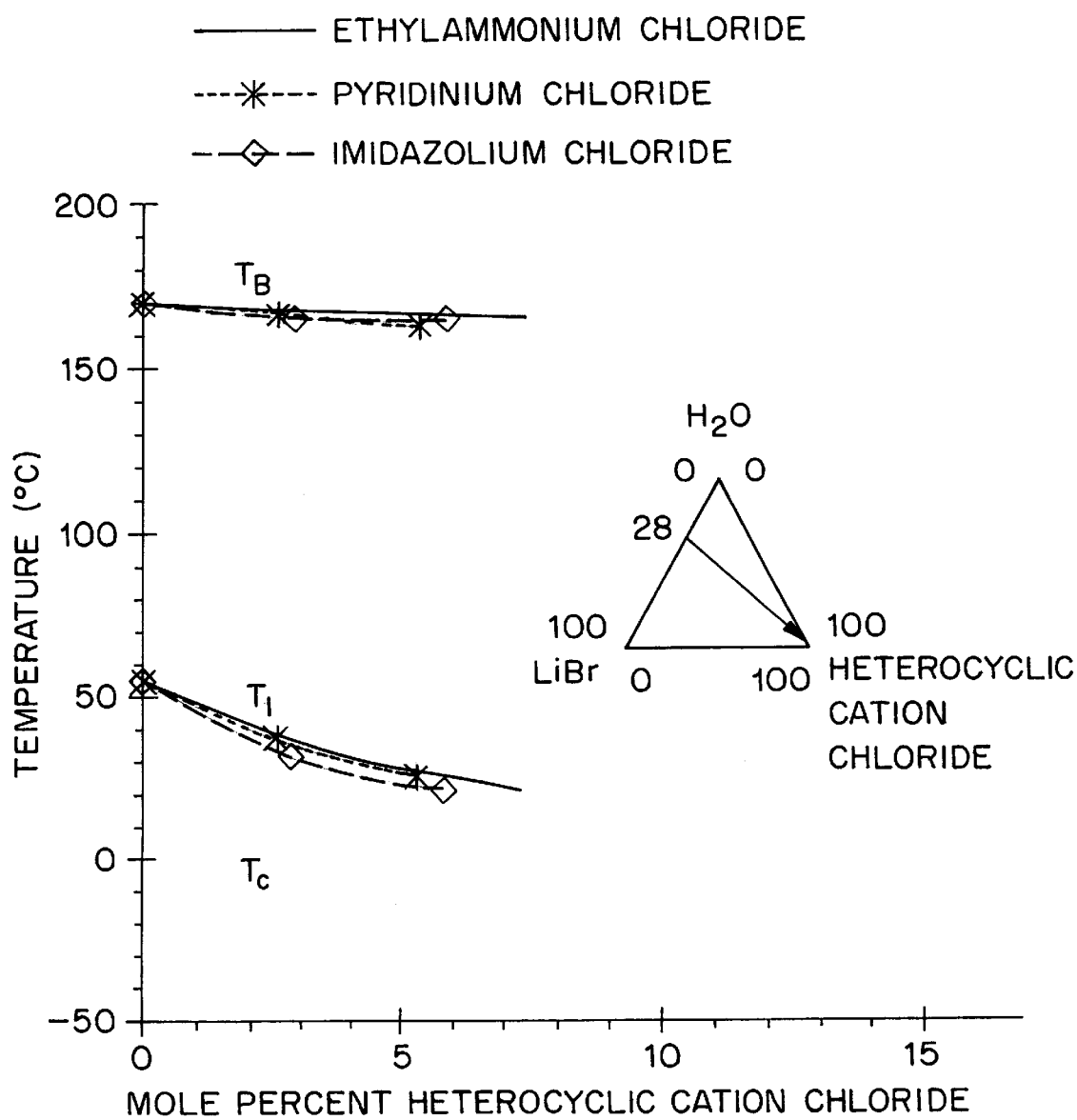
FIG. 10 is a graphical representation of the boiling temperature ($T_b$) and liquidus temperature ($T_l$) phase transitions for the ethylammonium chloride salt doped solutions of $(LiBr)_{28}(H_2O)_{72}$, shown in FIG. 8, and for heterocyclic cation chloride salt (i.e., pyridinium chloride and imidazolium chloride, respectively) doped solutions of $(LiBr)_{28}(H_2O)_{72}$.

The effect of replacing the simple alkyl ammonium salt with an aromatic ring analog is seen in FIG. 10. More specifically, FIG. 10 shows the results obtained when pyridinium chloride is used in place of ethylammonium chloride. FIG. 10 also includes data for the case in which the heterocyclic, e.g., resonance-stabilized cyclic aromatic, compound imidazolium chloride is used. The use of imidazolium chloride seems to provide comparable if not improved results, as compared to the use of ethylammonium chloride.

Figure 11:
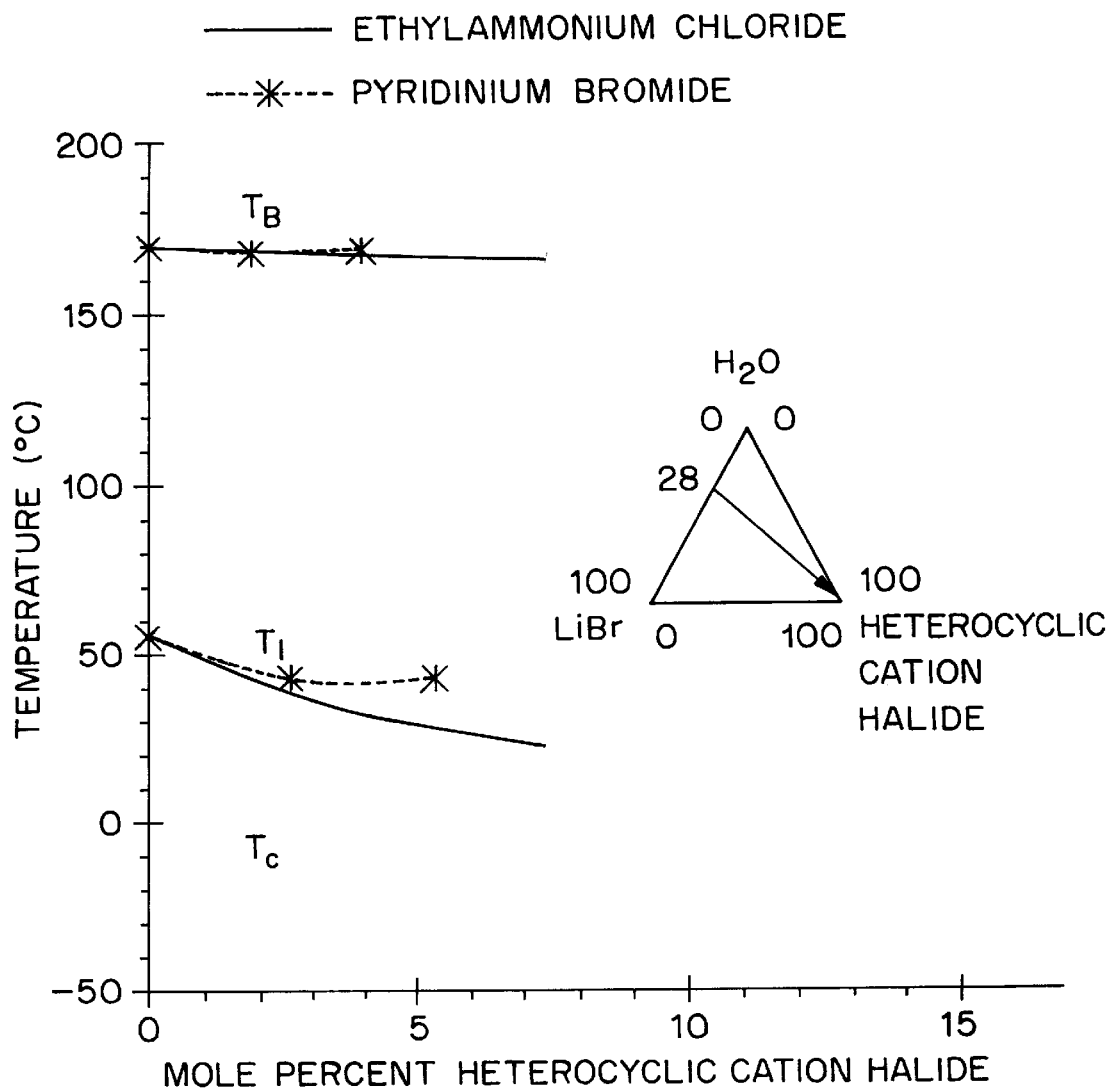
FIG. 11 is a graphical representation of the boiling temperature ($T_b$) and liquidus temperature ($T_l$) phase transitions for the ethylammonium chloride salt doped solutions of $(LiBr)_{28}(H_2O)_{72}$, shown in FIG. 8, and for heterocyclic cation halide salt (i.e., pyridinium bromide) doped solutions of $(LiBr)_{28}(H_2O)_{72}$.

The effect of replacing chloride with bromide in the heterocyclic compound, pyridinium, is shown in FIG. 11. Again a diminution of the melting point lowering effect is observed.

It will be readily apparent to one skilled in the art, that additional variations on this theme in which an aromatic ring is appended to the ammonium ion, as in the anilinium cation (PhNH$_3^+$) or to an alkyl ammonium ion, as in PhCH$_2$NH$_3^+$, as well as derivatives thereof will also be effective in obtaining the objectives of the invention.

Finally, to explore a higher boiling point range and in order to reduce the melting point of the monohydrate, the water content of the test solutions was reduced to values between 2 and 1 mole of water per mole of lithium, and the organic cation content was somewhat increased. In recognition of the manner in which double effect refrigeration processes are commonly engineered, a much higher melting temperature was tolerated in this portion of the study.

Figure 12:
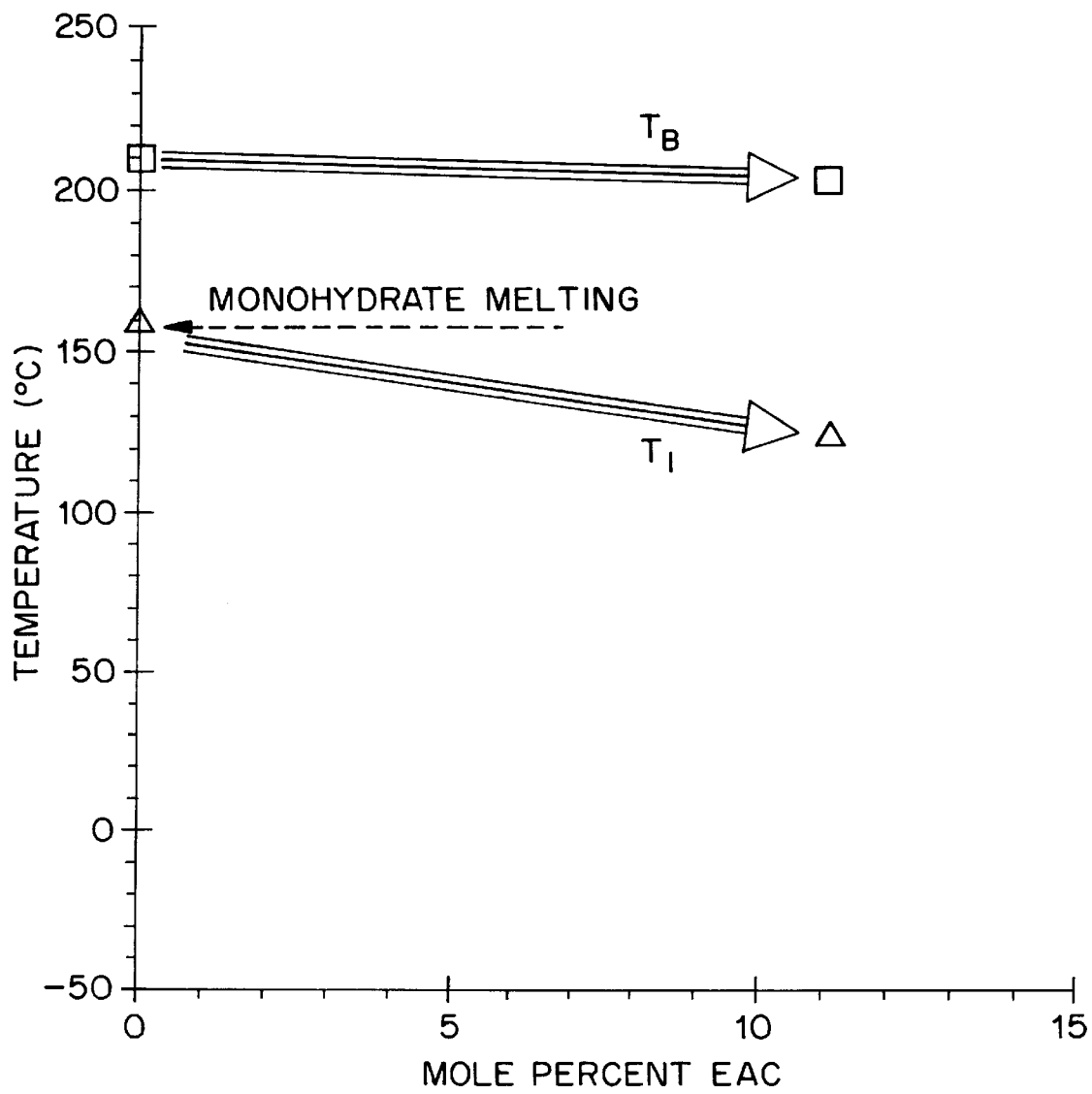
FIG. 12 is a graphical representation of the effect of ethylammonium chloride additive on the phase transitions, e.g., boiling temperature ($T_b$) and liquidus temperature ($T_l$) for solutions of $(LiBr)_{50}(H_2O)_{50}+EAC$.

The results of this portion of the study are shown in FIG. 12. As shown, solutions of EAC in LiBr.H$_2$O (monhydrate) with boiling points nears 200° C. can be obtained. Also, as shown, melting point temperatures in this case were found to lie in the range of about 120° C., far below the peritectic melting point of 160° C. assigned to the monohydrate.

By using small quantities of a new and inexpensive additive (a low-melting organic cation salt), alone or in combination with small additions of a lithium pseudo-halide LiSCN, lithium bromide-based solutions have been obtained which have boiling points near 170° C. but which are thermodynamically stable against crystallization at temperatures well below ambient. Furthermore, solutions with boiling points near 175° C. which only partly crystallize at ambient to an innocuous phase, not the dihydrate, can be obtained on further reduction of the water content. We propose these systems as an improvement on current absorption refrigerant fluids.

In view of the above, it will be appreciated that the invention provides refrigerant fluids and related methods of refrigerant fluid crystallization control such as may be desirable for use in evaporative refrigeration systems. In particular, the invention provides refrigerant fluids and related methods of refrigerant fluid crystallization control which avoid crystallization problems such as related to the crystallization of troublesome lithium halide hydrates without requiring the sacrifice of the high boiling points of the corresponding lithium halide refrigerant fluid and without significantly increasing the total cost of components. Furthermore, such advantages are obtainable without detrimentally decreasing the water content of the solution significantly as may occur with current industry-favored approaches involving the addition of a Lewis acid, such as ZnCl$_2$ or ZnBr$_2$, in order to yield a solution having a lower melting temperature, while also avoiding detrimental increase in solution density and corrosivity. Also, by combination with an inorganic salt, such as a lithium salt, e.g., LiSCN, a system with lower corrosion rates and higher boiling points can be obtained.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of controlling crystallization in a refrigerant fluid comprising water and at least one lithium halide selected from the group consisting of lithium chloride, lithium bromide, lithium iodide and mixtures thereof, said method comprising the step of:
    adding to the refrigerant fluid a salt material including an organic counter cation effective to suppress crystallization of the refrigerant fluid.

2. The method of claim 1 wherein the salt material comprises an alkyl ammonium cation.

3. The method of claim 1 wherein the salt material comprises a phenyl ammonium cation or a derivative thereof.

4. The method of claim 1 wherein the salt material comprises a heterocyclic cation.

5. The method of claim 4 wherein the heterocyclic cation is pyridinium.

6. The method of claim 4 wherein the heterocyclic cation is imidazolium.

7. The method of claim 1 wherein the salt material includes a weakly basic anion.

8. The method of claim 7 wherein the weakly basic anion is chloride.

9. The method of claim 7 wherein the weakly basic anion is bromide.

10. The method of claim 7 wherein the weakly basic anion is selected from the group consisting of perchlorate, fluorosulfonate, nitrate, tetrafluoroborate, tetraphenylborate and mixtures thereof.

11. The method of claim 1 wherein the salt material includes a pseudohalide selected from the group consisting of SCN$^-$ and CNO$^-$.

12. The method of claim 1 wherein the refrigerant fluid lithium halide is lithium bromide.

13. The method of claim 12 wherein the refrigerant fluid contains about 25 to about 40 mol % lithium bromide.

14. The method of claim 1 additionally comprising the step of adding to the refrigerant fluid a quantity of an inorganic salt effective acting with the organic salt to further depress the crystallization temperature of the refrigerant fluid lithium halide.

15. The method of claim 14 wherein the inorganic salt is a lithium salt.

16. The method of claim 15 wherein the lithium salt is LiSCN.

17. The method of claim 1 wherein the salt material comprises a phosphonium cation.

18. The method of claim 1 wherein the salt material comprises a sulfonium anion.

19. The method of claim 1 wherein the lithium halide is LiBr and the refrigerant fluid is thermodynamically stable against crystallization of LiBr dihydrate down to a temperature of about 10° C.

20. The method of claim 19 wherein the refrigerant fluid has a boiling point in excess of 160° C.

21. The method of claim 19 wherein the refrigerant fluid has a boiling point in excess of 170° C.

22. The method of claim 1 wherein the lithium halide is lithium bromide and the crystallization temperature of lithium bromide monohydrate is depressed to about 120° C.

23. A method of controlling crystallization in a refrigerant fluid comprising water and at least one lithium halide selected from the group consisting of lithium chloride, lithium bromide, lithium iodide and mixtures thereof, said method comprising the step of:
    adding to the refrigerant fluid a lithium salt and an organic salt material formed of a basic anion selected from the group consisting of chloride and bromide and an alkyl ammonium counter cation, the lithium salt and organic salt effective to synergistically suppress crystallization of the lithium halide.

24. A refrigerant fluid comprising:
    an aqueous lithium halide solution and
    a salt material formed of a basic anion selected from the group consisting of chloride and bromide and an organic counter cation effective to inhibit crystallization of the refrigerant fluid.

25. The refrigerant fluid of claim 24 wherein the aqueous lithium halide solution comprises lithium bromide hydrate.

26. The method of claim 1, wherein the salt material comprises a phenyl derivative of an alkyl ammonium cation.

27. The method of claim 1, wherein the salt material comprises an ethoxy derivative of an alkyl ammonium cation.

28. The refrigerant fluid of claim 24 wherein the salt material comprises an alkyl ammonium cation.

29. The refrigerant fluid of claim 24 wherein the salt material comprises a phenyl derivative of an alkyl ammonium cation.

30. The refrigerant fluid of claim 24 wherein the salt material comprises an ethoxy derivative of an alkyl ammonium cation.

31. The refrigerant fluid of claim 24 wherein the salt material comprises a phenyl ammonium cation or a derivative thereof.

32. The refrigerant fluid of claim 24 wherein the salt material comprises a heterocyclic cation.

33. The refrigerant fluid of claim 32 wherein the heterocyclic cation is pyridinium.

34. The refrigerant fluid of claim 32 wherein the heterocyclic cation is imidazolium.

35. The refrigerant fluid of claim 24 wherein the basic anion is chloride.

36. The refrigerant fluid of claim 24 wherein the basic anion is bromide.

37. The refrigerant fluid of claim 36 comprising about 25 to about 40 mol % lithium bromide.

38. The refrigerant fluid of claim 24 additionally comprising a quantity of an inorganic salt effective acting with the organic salt to further depress the crystallization temperature of the refrigerant fluid lithium halide.

39. The refrigerant fluid of claim 38 wherein the inorganic salt is a lithium salt.

40. The refrigerant fluid of claim 39 wherein the lithium salt is LiSCN.

41. The refrigerant fluid of claim 24 wherein the salt material comprises a phosphonium cation.

42. The refrigerant fluid of claim 24 wherein the salt material comprises a sulfonium cation.

43. The refrigerant fluid of claim 24 wherein the aqueous lithium halide solution comprises lithium bromide hydrate and the refrigerant fluid is thermodynamically stable against crystallization of LiBr dihydrate down to a temperature of about 10° C.

44. The refrigerant fluid of claim 43 wherein the refrigerant fluid has a boiling point in excess of 160° C.

45. The refrigerant fluid of claim 43 wherein the refrigerant fluid has a boiling point in excess of 170° C.

46. The refrigerant fluid of claim 24 wherein the aqueous lithium halide solution comprises lithium bromide hydrate and the crystallization temperature of lithium bromide monohydrate is depressed to about 120° C.

* * * * *

UNITED STATES PATENT AND TRADEMARK OFFICE
CERTIFICATE OF CORRECTION

PATENT NO. : 6,155,057
APPLICATION NO. : 09/260473
DATED : December 5, 2000
INVENTOR(S) : Angell et al.

Page 1 of 1

It is certified that error appears in the above-identified patent and that said Letters Patent is hereby corrected as shown below:

On the Cover Page:

[75] Inventors: "Hemalata Senapati" read -- Senapati Hemalata --

Column 3, line 4: "comprehends" should read -- contemplates --
Column 3, line 15: "comprehends" should read -- contemplates --
Column 3, line 64: "show" should read -- shows --
Column 3, line 66: "show" should read -- shows --
Column 6, line 13: "lohde" should read -- lhode --
Column 9, line 2: "monhydrate" should read -- monohydrate --

Column 10, line 23: "effective" should read -- effectively --
Column 10, line 63: "claim 1," should read -- claim 1 --
Column 10, line 65: "claim 1," should read -- claim 1 --
Column 11, line 25: "effective" should read -- effectively --

Signed and Sealed this

Twenty-fifth Day of March, 2008

JON W. DUDAS
*Director of the United States Patent and Trademark Office*